United States Patent
Matsushita (10) Patent No.: US 6,648,659 B2
(45) Date of Patent: Nov. 18, 2003

(54) LEVER-TYPE CONNECTOR AND A METHOD FOR MOUNTING A LEVER-TYPE CONNECTOR INTO A HOLE OF A PANEL

(75) Inventor: Yasuo Matsushita, Yokkaichi (JP)

(73) Assignee: Sumitomo Wiring Systems, Ltd. (JP)

( * ) Notice: Subject to any disclaimer, the term of this patent is extended or adjusted under 35 U.S.C. 154(b) by 0 days.

(21) Appl. No.: 10/152,605

(22) Filed: May 21, 2002

(65) Prior Publication Data

US 2002/0178538 A1 Dec. 5, 2002

(30) Foreign Application Priority Data

May 30, 2001 (JP) .................................... 2001-163164

(51) Int. Cl.[7] .............................................. H01R 13/62
(52) U.S. Cl. ...................................... 439/157; 439/544
(58) Field of Search ................................ 439/157, 544, 439/310, 549, 569, 557, 565

(56) References Cited

U.S. PATENT DOCUMENTS 5,279,506 A * 1/1994 Kawase et al. ............. 439/157

FOREIGN PATENT DOCUMENTS

JP          9-245886         9/1997

* cited by examiner

Primary Examiner—Tho D. Ta
(74) Attorney, Agent, or Firm—Anthony J. Casella; Gerald E. Hespos (57) ABSTRACT

A lever-type connector (A) has male housing (10) with a receptacle (13) and a female housing (20) that is insertable into the receptacle (13). The lever (30) has inclined guides (36) that contact an edge of the mount hole (H) and guide the connector (A) smoothly to a proper position with respect to the mount hole (H). A rear surface (20R) of a female housing (20) is before the guide (36) when the female housing (20) is fit into the receptacle (13) and with a lever (30) at a standby position. Thus, fingers that push the rear surface (20R) of the female housing (20) do not touch the guides (36) when the female housing (20) is fitted into the receptacle (13).

14 Claims, 6 Drawing Sheets

LEVER-TYPE CONNECTOR AND A METHOD FOR MOUNTING A LEVER-TYPE CONNECTOR INTO A HOLE OF A PANEL

BACKGROUND OF THE INVENTION

1. Field of the Invention

The invention relates to a lever-type connector mountable on a panel and to method for mounting a lever-type connector into a hole of a panel.

2. Description of the Related Art

A lever-type connector that is mountable on a panel is disclosed in Japanese Unexamined Patent Publication No. 9-245886. This connector has a male housing that is mounted in a mount hole of a panel beforehand and that is held in a standby state. A female housing is engageable with the male housing and has a lever that can be operated for properly connecting the two housings.

Part of the female housing and the lever project at the outer side of the panel and require an operating space. However, the connector may be mounted to a panel, for example, near a hinge of a door of an automotive vehicle, and sufficient space cannot be ensured around the panel when the door is closed. Thus, it is difficult to use the above-described lever connector.

A construction has been considered for connecting the two housings at the outer side of the door panel beforehand and then mounting the already connected housings into the mount hole of the panel so that the two housings and the lever are at the inner side of the door panel. In this construction, locks that engage the mount hole are at the rear end of the male connector housing and a receptacle is at its front end. The lever is mounted pivotally on the male housing and is held at a standby position beforehand so that entrances of cam grooves of the lever open forward. The female housing is fit lightly into the receptacle in this state so that cam followers of the female housing enter the cam grooves. The lever then is pivoted toward a connection position to connect the housings. The locks at the rear end of the male housing then engage the edge of the mount hole and the lever-type connector is accommodated at the inner side of the panel.

A mount hole normally is formed in a panel by stamping the panel with a press. It has been found, however, that the lever of the above-described lever-type connector is likely to get caught by the edge of the mount hole if the lever-type connector is being mounted into the mount hole by one hand in a narrow space, such as a space between a vehicle body and a door hinge. Thus, a smooth mounting operation is hindered.

Contact between the lever and the edge of the mount hole during mounting could inadvertently return the lever of the above-described connector from the connection position to the standby position. This undesired movement of the lever during mounting could be avoided with a lever that is at the front end of the receptacle in the standby position and that is displaced backward to reach the connection position. However, the installer's fingers may interfere with the lever at the front end of the receptacle in the standby position when the female housing is being fit into the receptacle, and thus may hinder connection.

The present invention was developed in view of the above problem and an object thereof is to enable a connector to be mounted smoothly into a mount hole and particularly to enable a second housing to be fit smoothly into a receptacle of a first housing with a lever at a first standby position.

SUMMARY OF THE INVENTION

The invention is directed to a lever-type connector to be mounted into a mount hole of a panel. The connector includes a first housing with a receptacle at its front end and a second housing that is fittable into the receptacle. A lever is mounted on the first housing and is pivotal between first and second positions. The lever and the second housing have cam means that cooperate as the lever is pivoted to urge the housings into connection with one another. The lever has a forwardly facing guide that is oblique to a mounting direction of the connector into the mount hole. The guide can be brought into contact with an edge of the mount hole when the lever is at the second position.

The oblique guide of the lever contacts the edge of the mount hole if the connector is displaced from the mount hole during the mounting of the connector to the panel. Thus, the obliquely inclined guide guides the lever-type connector properly into the mount hole, and a smooth mounting is achieved.

A rear surface of the second housing preferably is substantially flush with or before the guide when the lever is at the first position and when the second housing is fit in the receptacle. Thus, fingers of an installer do not push the guide while the installer fits the second housing into the receptacle, and hence, the second housing can be fit smoothly into the receptacle.

The cam means preferably comprises a cam follower on one of the second housing and the lever and a cam groove formed in the other of the second housing and the lever.

The housings may be connected with each other by pivoting the lever and the connected housings then are mounted into the mount hole of the panel.

The first position of the lever preferably is a standby position and the second position is a connection position in which the housings are connected.

The guide of the lever may be formed with at least one slanted surface inclined from an outer surface of at least one arm of the lever toward an inner surface thereof. The slanted surface will guide the second housing toward the receptacle to correct any misalignment during the initial phases of mating. In this way, an operation of fitting the second housing into the receptacle can be made smoother.

The lever preferably has an operable portion and two arms that extend from the opposite lateral ends of the operable portion. The guide is at front edges of the arms. A finger placing portion is at the front end of the operable portion and projects more forward than the guide. Thus, the lever can be pivoted securely by placing fingers on the finger placing portion.

The invention also is directed to a method for mounting a lever-type connector into a hole of a panel. The method comprises providing a first housing with a receptacle and a lever that can be pivoted between first and second positions. The method continues by fitting a second housing into the receptacle of the first housing with the lever held at the first position, so that cam means of the lever and the second housing engage. The method proceeds by pivoting the lever to the second position to connect the two housings with each other. The method further proceeds by mounting the connected housings into the hole of the panel. The mounting is guided by at least one guide formed on the lever which is oblique to a mounting direction of the connector into the mount hole and can be brought into contact with an edge of the mount hole with the lever held at the second position.

These and other objects, features and advantages of the present invention will become more apparent upon reading of the following detailed description of preferred embodiments and accompanying drawings. It should be understood that even though embodiments are described separately, single features thereof may be combined to additional embodiments.

DETAILED DESCRIPTION OF THE PREFERRED EMBODIMENTS

A lever-type connector according to the invention is identified by the letter A in FIGS. 1–6. The connector A includes a male housing 10, a lever 30 mounted on the male housing 10 and a female housing 20. The connector A is mountable into a mount hole H of a panel P after the housings 10, 20 are connected with each other.

The male housing 10 has an oblong shape with substantially semicircular upper and lower ends. A substantially oblong flange 11 projects out at the rear end of the male housing and resilient locks 12 are located slightly before the flange 11. Terminal fittings (not shown) are accommodated in the male housing 10 and wires (not shown) connected to the terminal fittings are drawn out through the rear end of the male housing 10.

A receptacle 13 is formed at the front end of the male connector housing 10, and shafts 15 project from the left and right lateral surfaces of the receptacle 13 for supporting the lever 30. Escape grooves 16 are formed in the left and right side walls of the receptacle 13 and extend from the front end 13F of the receptacle 13 toward the corresponding shaft 15 substantially parallel with a fitting direction of the female connector housing 20 into the receptacle 13.

The receptacle 13 is shorter and narrower than portions of the male housing 10 adjacent the flange 11. An inverted substantially U-shaped space 14 is defined by clearances between the top and sides surfaces of the male housing 10 and the top and side surfaces of the receptacle 13 when the connector A is viewed from the front. The lever 30 is provided in this space 14.

Figure 2:
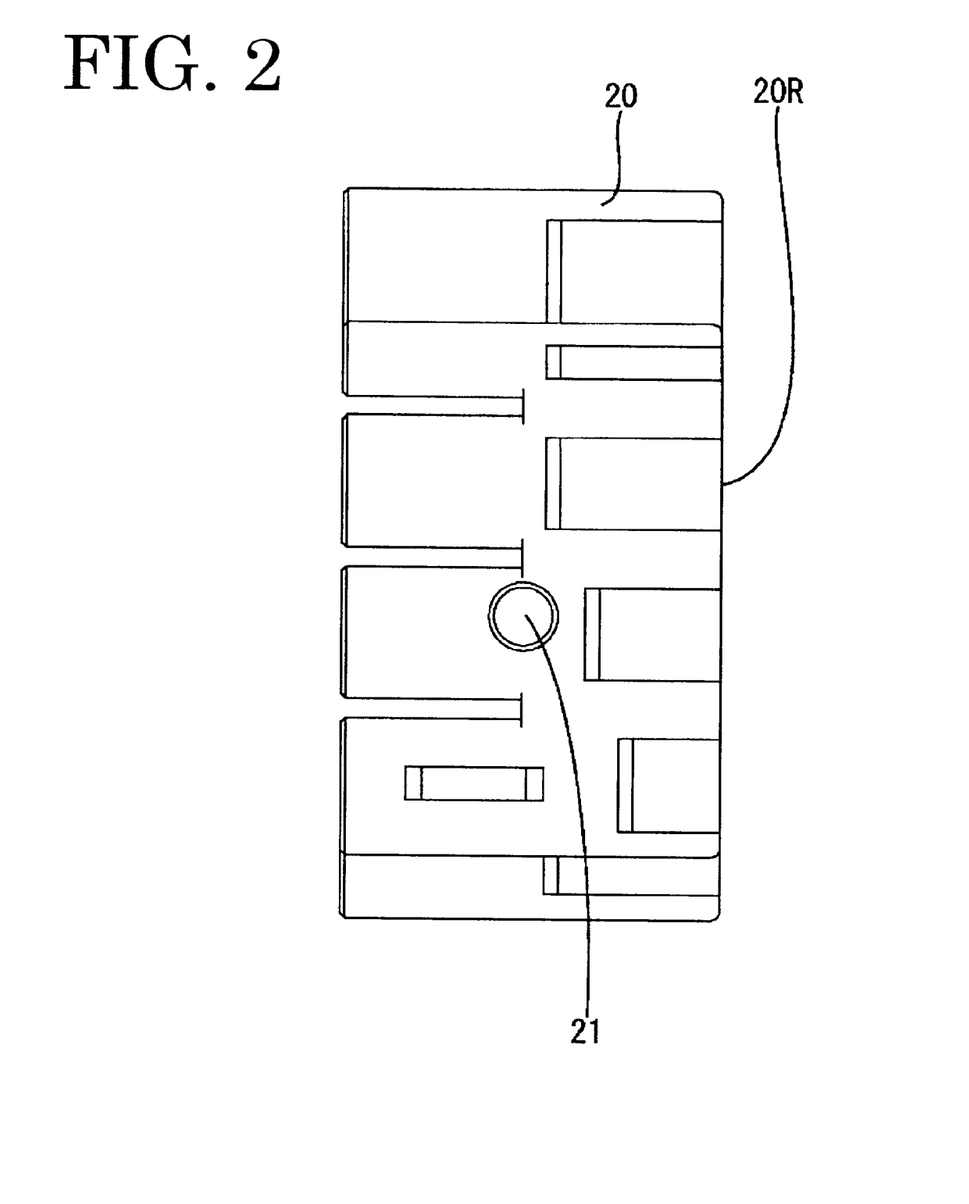
FIG. 2 is a side view of the female housing.

The female housing 20 accommodates female terminal fittings (not shown), and wires (not shown) connected with the female terminal fittings are drawn out through a rear surface 20R of the female housing 20. The female housing 20 is pushed forward manually by fingers placed on the rear surface 20R so that the front end fits into the receptacle 13. Cam followers 21 project from the left and right outer surfaces of the female housing 20.

Figure 1:
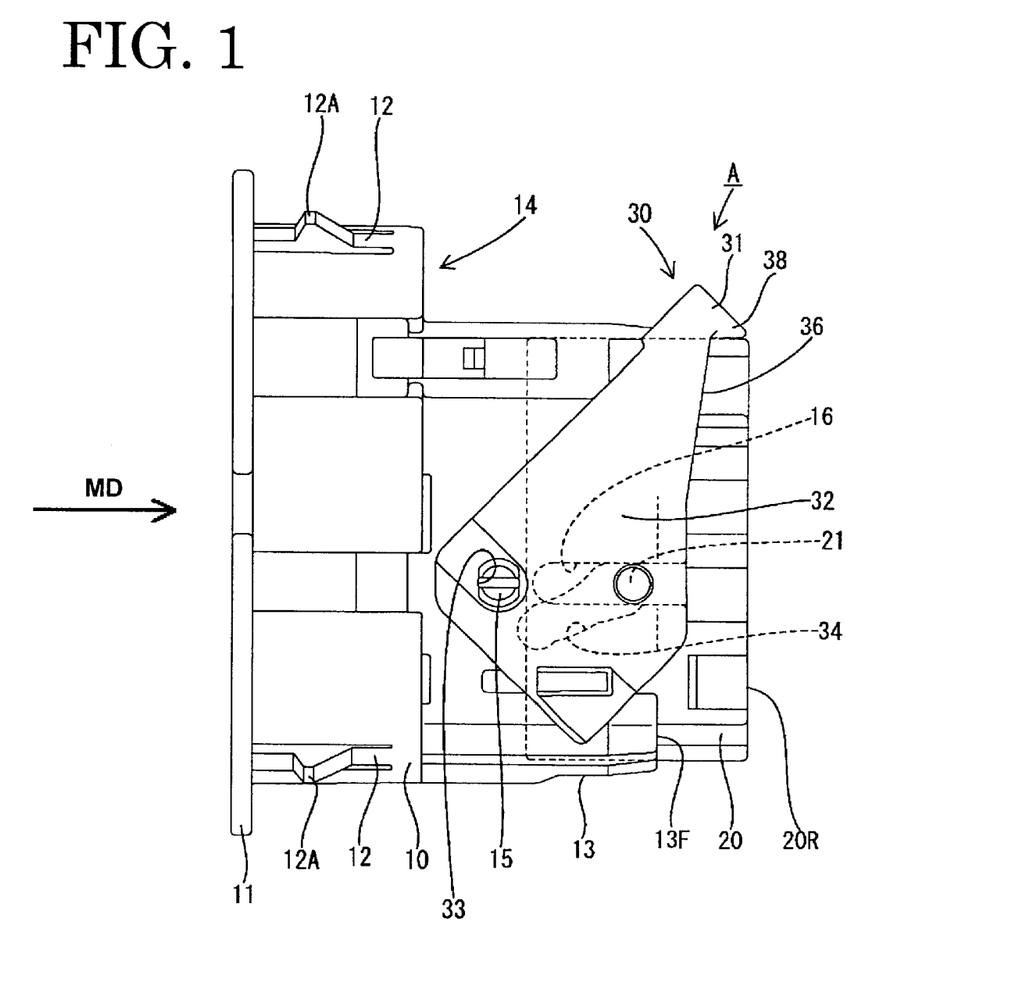
FIG. 1 is a side view showing a state where a female housing is fitted into a receptacle with a lever held at a standby position.
Figure 3:
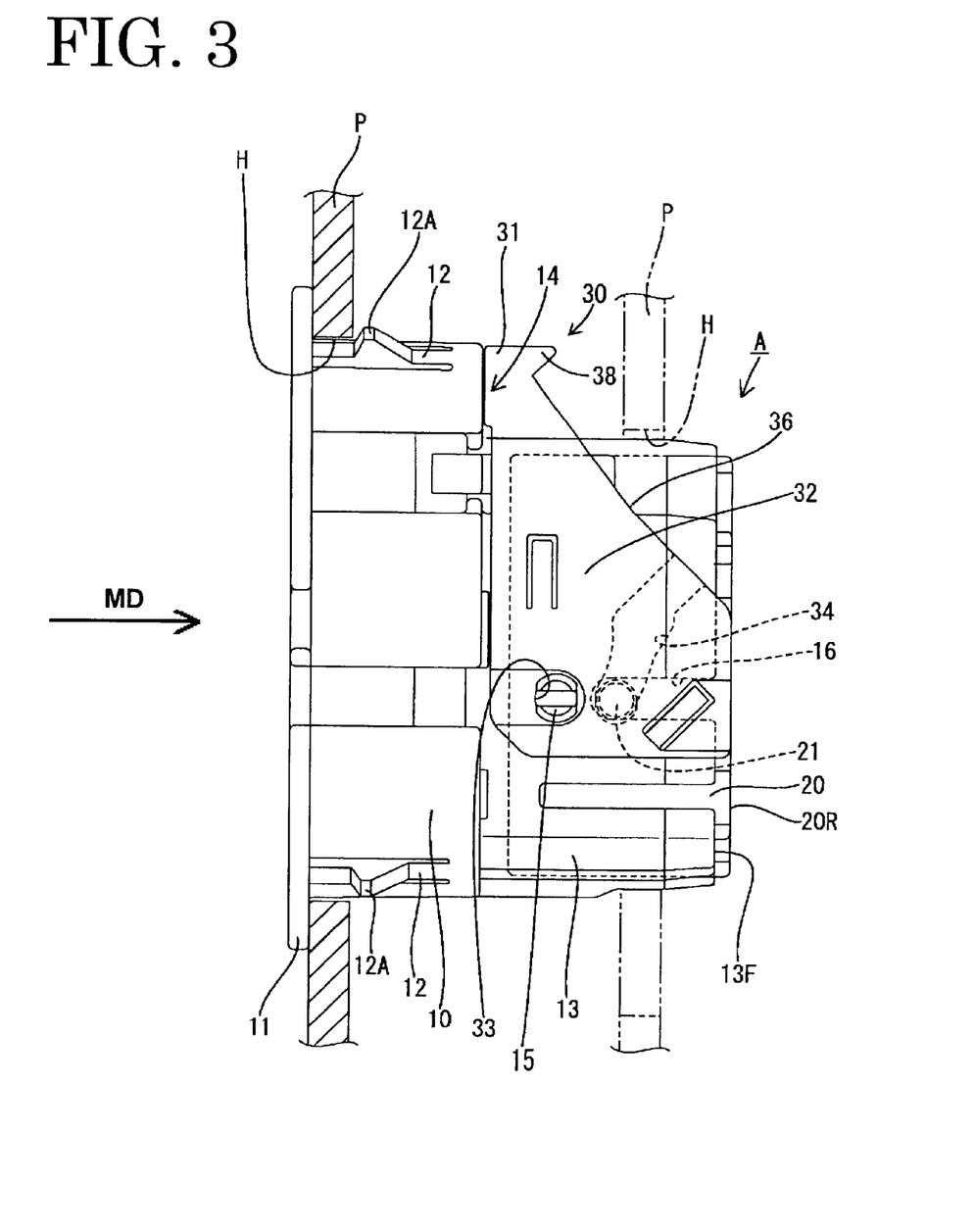
FIG. 3 is a side view showing a state where two housings already connected are mounted into a mount hole.

The lever 30 has an operable portion 31 and two substantially parallel plate-shaped arms 32 project from opposite lateral ends of the operable portion 31. The arms 32 having bearing holes 33 that engage pivotally with the shafts 15 so that the lever 30 can be pivoted between a standby position, as shown in FIG. 1, and a connection position, as shown in FIG. 3. The lever 30 has cam grooves 34 that open forward toward the female housing 20 when the lever is in the standby position of FIG. 1 so that the cam followers 21 of the female housing 20 can enter the cam grooves 34. The cam followers 21 follow the cam grooves 34 as the lever 30 is rotated from the standby position to the connection position so that the housings 10, 20 are connected.

The housings 10, 20 are connected by positioning the lever 30 initially at the standby position. The rear surface 20R of the female housing 20 then is gripped manually and the female housing 20 is fit lightly into the receptacle 13 so that the cam followers 21 enter the cam grooves 34, as shown in FIG. 1. The lever 30 then is pivoted in the counter clockwise direction of FIGS. 1 and 3, and the housings 10, 20 are connected smoothly with each other by the leverage action of the engagement of the cam grooves 34 and the cam followers 21 even if an operation force given to the lever 30 is small. The housings 10, 20 are connected properly with each other when the lever 30 reaches the connection position.

The connector A with the properly connected housings 10, 20 can be fit into the oblong mount hole H from the front side (left side in FIGS. 1 and 3) of the panel P with the receptacle 13 faced toward the mount hole H. Thus, the flange 11 of the male connector housing 10 is brought into contact with the edge of the mount hole H from the front side and projections 12A of the resilient locking pieces 12 engage the edge of the mount hole H from the back. As a result, the connector A is mounted on the panel P.

The lever-type connector A has guides 36 for smoothly mounting the connector A into the mount hole H and smoothly fitting the female connector housing 20 into the receptacle 13 when the lever 30 is at the standby position (FIG. 1). The guides 36 are defined by the front edges of the arms 32 that face substantially forward when the lever 30 is at any orientation between the standby and connection positions. The guides 36 are oblique to the mounting direction MD of the connector A into the mounting hole H when the lever 30 is at the connection position (FIG. 3), but are substantially normal to the fitting direction of the female housing 20 into the receptacle 13 when the lever 30 is at the standby position (FIG. 1). Thus, the guides 36 contact the upper semicircular section of the edge of the mount hole H when an attempt is made to mount the lever-type connector A displaced upward with respect to the mount hole H.

Figure 4:
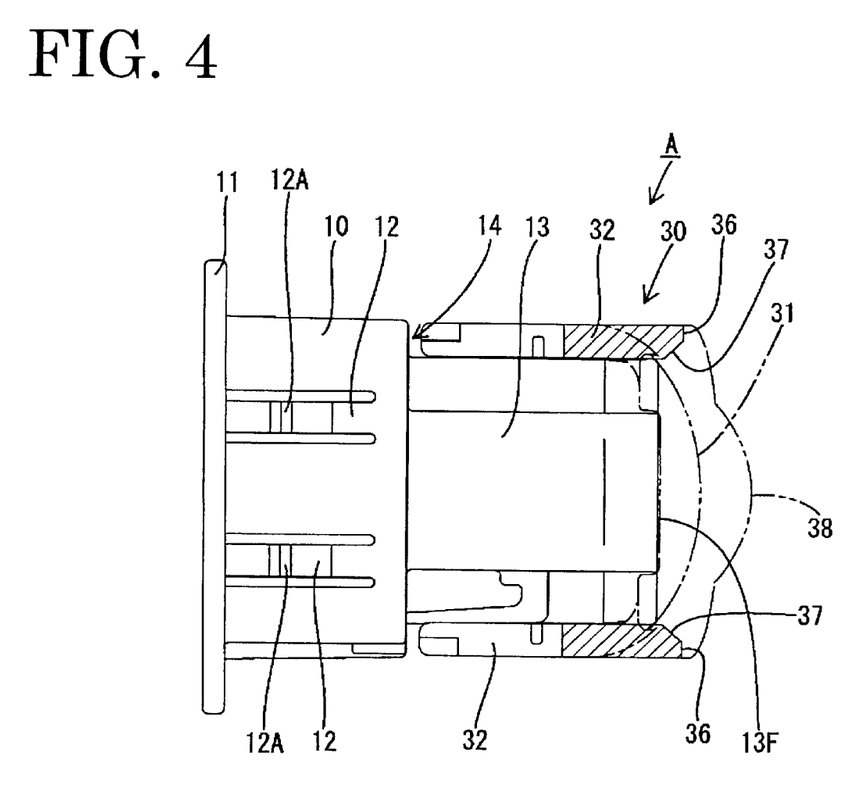
FIG. 4 is a plan view partly of a male housing.
Figure 5:
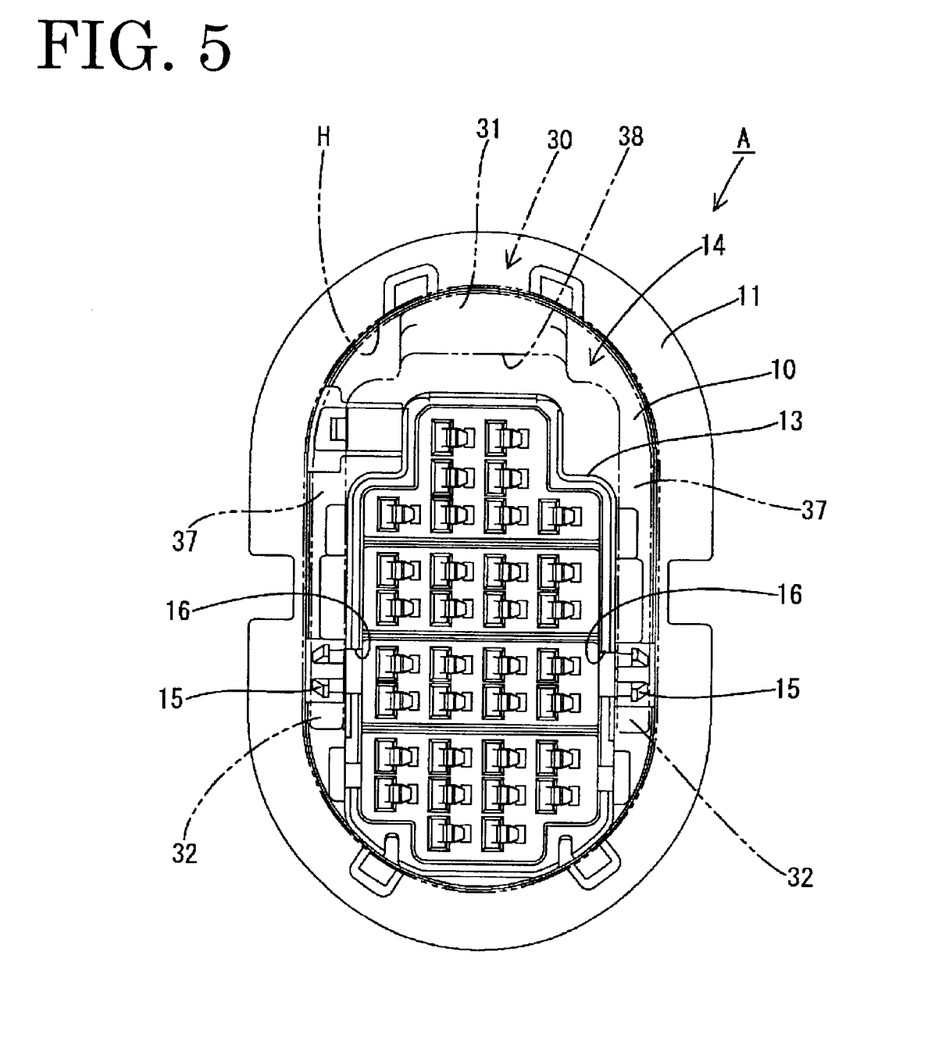
FIG. 5 is a front view of the male housing.
Figure 6:
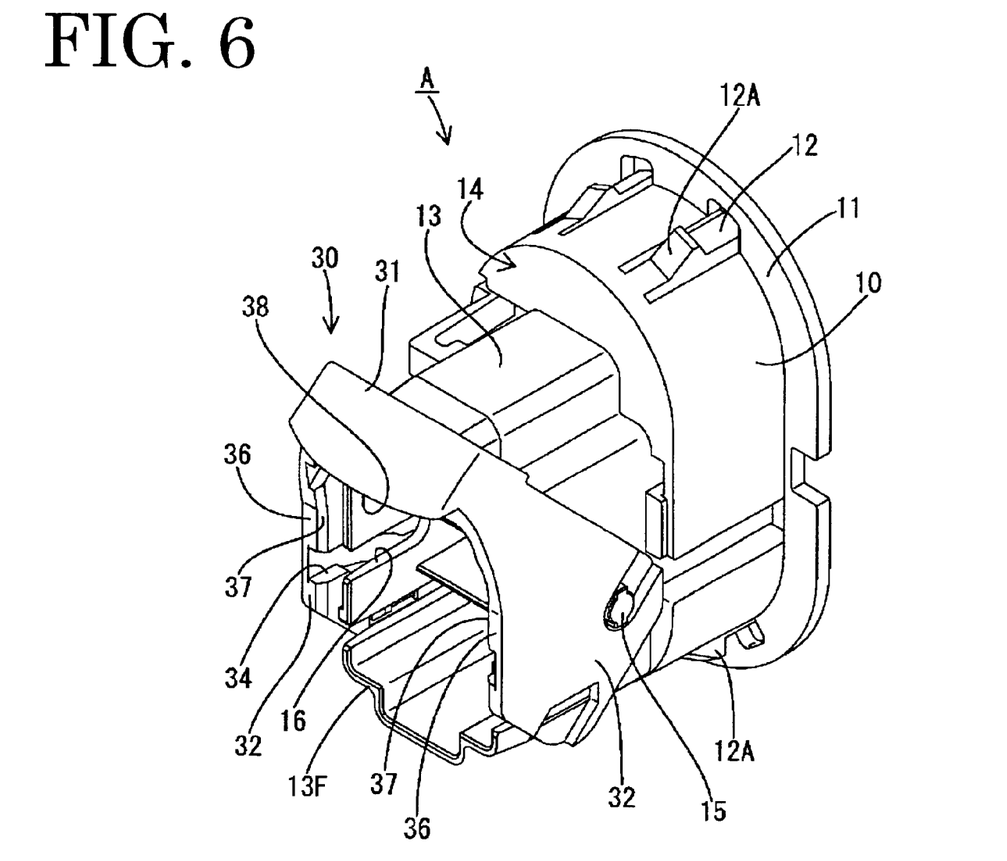
FIG. 6 is a perspective view of the male housing.

The female housing 20 is fit into the receptacle 13 when the lever 30 is at the standby position so that the cam followers 21 enter the cam grooves 34. The rear surface 20R of the female connector housing 20 is more forward (rightward in FIG. 1) than the guides 36. Further, the guides 36 are slightly before the front end 13F of the receptacle 13 when the lever 30 is at the standby position. Additionally, each guide 36 has a slanted surface 37 inclined obliquely backward from the outer surface of the arm 32 toward the inner surface thereof (FIGS. 4, 6). The slanted surfaces 37 also are located before the front end 13F of the receptacle 13 and serve as guiding means for guiding an insertion of the female connector housing 20 into the receptacle 13 of the male connector 10 along a transverse or lateral direction with respect to the insertion direction of the female connector housing 20.

The arms 32 of the lever 30 extend from the left and right ends of the operable portion 31 and the guides 36 are formed at the front edges of the arms 32. When the lever 30 is pivoted from the standby position to the connection position, fingers of the worker are placed on the operable portion 31 from the front to push the lever backward. A finger placing portion 38 projects more forward than the guides 36 at the front edge of the operable portion 31.

The lever-type connector A may be displaced slightly upward during mounting into the mount hole H. However, the guides 36 on the lever 30 obliquely contact the edge of the mount hole H and guide the lever-type connector A to a proper position in the mount hole H. Thus, the connector A can be mounted smoothly into the mount hole H.

Although the guides 36 face forward, the rear surface 20R of the female housing 20 is located before the guides 36 when the lever 30 is at the standby position and when the female housing 20 is being fit in the receptacle 13. Thus, fingers pushing the rear surface 20R of the female housing 20 do not touch the guides 36 while the female housing 20 is being fitted into the receptacle 13. Therefore, the female housing 20 can be fit smoothly into the receptacle 13. Similarly, the guides 36 are located before the front end 13F of the receptacle 13 when the lever 30 is at the standby position. Thus, fingers pushing the rear surface 20R of the female housing 20 do not touch the front end 13F of the receptacle 13. Therefore, the female housing 20 can be fit smoothly into the receptacle 13.

The female housing 20 may be displaced transversely to come contact the guide 36 while being fit into the receptacle 13. However, the female housing is guided by the inclination of the slanted surfaces 37 formed on the guide 36 to have the displacement corrected. In this way, an operation of fitting the female housing 20 into the receptacle 13 can be made smoother.

The operable portion 31 is formed with the finger placing portion 38 projecting from the guiding portions 36. Therefore, the lever 30 at the standby position can be pivoted accurately and easily toward the connection position by placing fingers on the finger placing portion 38.

The present invention is not limited to the above described and illustrated embodiment. For example, the following embodiment is also embraced by the technical scope of the present invention as defined in the claims. Beside the following embodiment, various changes can be made without departing from the scope and spirit of the present invention as defined in the claims.

The rear surface of the female housing is before the guides when the lever is at the standby position and the female housing is in the receptacle. However, the rear surface of the female housing may be substantially flush with the guides.

The guides are before the front end of the receptacle when the lever is at the standby position. However, the guides may be substantially flush with or behind the front end of the receptacle. In the case that the guides are behind the front end of the receptacle, the rear surface of the female housing fit into the receptacle may be flush with or before the front end of the receptacle.

The guides are inclined from the outer surfaces of the arms toward the inner surfaces thereof to correct displacement of the female connector housing with respect to the receptacle. However, the guides may be normal to the inner and outer surfaces of the arms.

What is claimed is:

1. A lever-type connector to be mounted into a mount hole of a panel, the connector comprising a first housing having opposite front and rear ends and a lever pivotally mounted thereon for movement between a first position and a second position, the first housing further having a receptacle at the front end, a second housing fittable into the receptacle when the lever is at the first position, cam means on the second housing and the lever for urging the second housing into the receptacle by pivoting the lever toward the second position, the lever having a substantially forward facing guide which is oblique to a mounting direction of the connector into the mount hole for contacting an edge of the mount hole when the lever is at the second position and guiding the connector smoothly into the mount hole.

2. The lever-type connector of claim 1, wherein a rear surface of the second housing is before the guide when the lever is at the first position and the second housing is in the receptacle.

3. The lever-type connector of claim 1, wherein the cam means comprises a cam follower on one of the second housing and the lever and a cam groove formed in the other of the second housing and the lever.

4. The lever-type connector of claim 1, wherein the housings are connected with each other by pivoting the lever prior to mounting the connector into the mount hole of the panel.

5. The lever-type connector of claim 1, wherein the first position of the lever is a standby position and the second position thereof is a connection position in which the housings are substantially connected.

6. The lever-type connector according of claim 1, wherein the guide is before the front end of the first housing when the lever is at the first position.

7. The lever-type connector of claim 1, wherein the guide has at least one slanted surface inclined from an outer surface of at least one arm of the lever toward an inner surface thereof.

8. The lever-type connector of claim 1, wherein the lever has an operable portion and two arms that extend from opposite lateral ends of the operable portion, the guide being formed at front edges of the arms.

9. The lever-type connector of claim 8, wherein a finger placing portion is formed at a front edge of the operable portion and projects more forward than the guide.

10. A lever-type connector to be mounted into a mount hole of a panel, the connector comprising:
    a first housing having opposite front and rear ends and a receptacle at the front end;
    a lever having two arms pivotally mounted on the first housing and an operable portion extending between the arms, such that the lever is movable between a first position and a second position, cam grooves being formed on the arms;
    a second housing fittable into the receptacle when the lever is at the first position, cam pins on the second housing and engageable with the cam grooves for urging the second housing into the receptacle by pivoting the lever toward the second position; and
    forwardly facing guides formed on the arms and extending oblique to a mounting direction of the connector into the mount hole for contacting an edge of the mount hole when the lever is at the second position and guiding the connector smoothly into the mount hole.

11. The lever-type connector according of claim 10, wherein the guides are before the front end of the first housing when the lever is at the first position.

12. The lever-type connector of claim 11, wherein the guides each have a slanted surface inclined from an outer surface the respective arm toward an inner surface thereof.

13. The lever-type connector of claim 12, wherein a finger placing portion is formed at a front edge of the operable portion and projects more forward than the guides.

14. A method for mounting a lever-type connector into a hole of a panel, comprising the following steps:
    providing a lever pivotable between a first position and a second position on a first housing, the first housing having a receptacle;
    fitting a second housing into the receptacle of the first housing when the lever is at the first position for engaging a cam means on the lever and the first housing;

pivoting the lever toward the second position for connecting the housings; and mounting the connector in such state into the hole of the panel, wherein the mounting is guided by at least one guide formed on the lever which is oblique to a mounting direction of the connector into the mount hole and can be brought into contact with an edge of the mount hole with the lever held at the second position.

* * * * *